Figure 1:
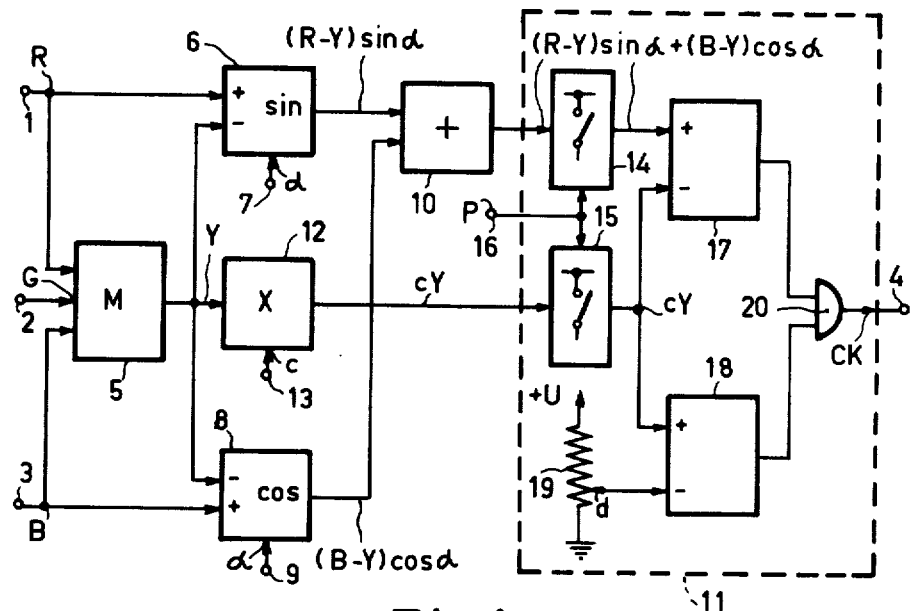

United States Patent
Davidse et al.

[11] 4,051,520
[45] Sept. 27, 1977

[54] COLOR TELEVISION CHROMA KEYING SIGNAL GENERATOR

[75] Inventors: Jan Davidse, Rotterdam; Rudolf P. Koppe, Eindhoven, both of Netherlands

[73] Assignee: U.S. Philips Corporation, New York, N.Y.

[21] Appl. No.: 712,947

[22] Filed: Aug. 9, 1976

[30] Foreign Application Priority Data

Aug. 20, 1975 Netherlands .................. 7509871

[51] Int. Cl.$^2$ ............................................. H04N 9/535
[52] U.S. Cl. .............................................. 358/22
[58] Field of Search ..................... 358/22, 40, 30; 340/324 AD

[56] References Cited

U.S. PATENT DOCUMENTS 3,678,182  7/1972  Boxman et al. ............ 358/22
3,771,155  11/1973  Hayashi et al. ............ 340/324 AD
3,959,813  5/1976  Legler .................... 358/22

*Primary Examiner*—Richard Murray
*Assistant Examiner*—Mitchell Saffian
*Attorney, Agent, or Firm*—Frank R. Trifari; Henry I. Steckler

[57] ABSTRACT

A chroma keying signal generator which does not operate in the usual manner with luminance dependent color difference signals (R-Y) and (B-Y) but with luminance independent chromaticity signals (R-Y)/Y and (B-Y)/Y. On the one hand a signal division may follow in the generator for deriving the chromaticity signals and on the other hand a threshold circuit may be used having a threshold voltage which varies with the luminance. Owing to the fact that generating the signal is independent of the luminance an intense, uniform background illumination without shadows thereon is no longer required.

6 Claims, 2 Drawing Figures

COLOR TELEVISION CHROMA KEYING SIGNAL GENERATOR

The invention relates to a colour television chroma keying signal generator provided with a matrix circuit for supplying to an output a colour signal combination of colour signals supplied to inputs thereof with two signal combination and multiplication circuits subsequent to the matrix circuit which each have an adjustable multiplication factor and provide colour-difference signals, with a signal adder circuit for forming a composite colour difference signal and with a threshold circuit subsequent to the adder circuit for supplying a chroma keying signal to an output of the generator.

Such a chroma keying signal generator is disclosed in U.S. Pat. No. 3,560,638. It is indicated that the keying signal produced may be utilized for forming a single television image from video signals derived from two separate, synchronized video signal sources. Herewith one video signal supplies the background information and the other a scene information which must be displayed with the background inserted therein. For example, the scene information is recorded by means of a television camera against its own, uniformly coloured background of a colour which is substantially not found in the scene information to be inserted. The colour blue is frequently used for the background. The background colour should be saturated to a very high degree and must be as close as possible to the primary colour (blue). Furthermore the background must be illuminated intensely and uniformly, independent of the scene illumination which shall not produce shadows on the background. Reflections in the background and the scene must be avoided. The chroma keying signal is derived from the uniformly coloured background when the signal value of a (background) colour signal exceeds the threshold value of the threshold circuit.

In practice it appears that when keying the video signals for the scene information and the background, faults appear to occur in the displayed image in the shape of conspicuous blue edges between the scene and filled-in-background and in the shape of ravelled contours. Possible causes are: inequal time delays in the signals, noise, details which are too fine, and a not properly feasible signal separation between the video signal containing the video information and that containing the background to be inserted. Therefore the threshold circuit does not operate optimally.

It is an object of the invention to realize a chroma keying signal generator with which, as practice proves, an improved signal separation is obtained, and the requirements for the illumination and the provision of the substantially uniform background against which the scene is televised are less critical. To that end a generator according to the invention is characterized in that the threshold circuit of the generator is constructed as a threshold circuit which operates with chromaticity signals.

The invention is based on the recognition that colour difference signals which are proportional to brightness variations, must not, as is usual, be utilized for producing the chroma keying signals, but the chromaticity signals, which are independent of brightness variations should be used to produce the chroma keying signals. An improved signal separation is achieved in this manner. As the keying signal production is independent of the brightness, no intensive uniform illumination of the background without shadows is required anymore, that is to say, that this requirement is no longer critical for a proper operation of the generator.

Figure 2:
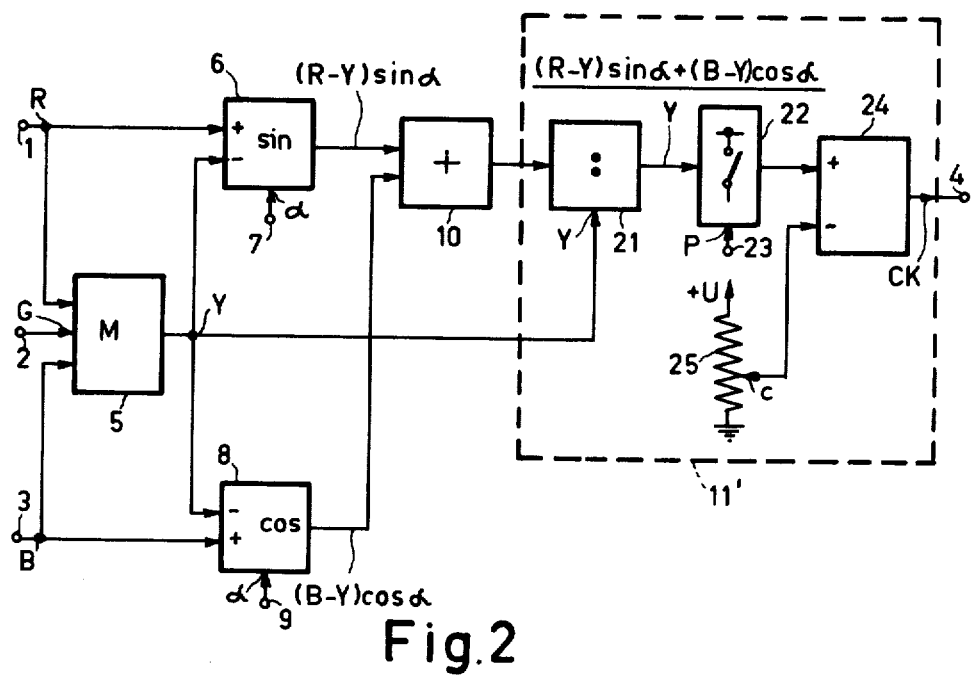

The invention will be explained by way of example with reference to the following figures in which FIG. 1 shows an embodiment of a chromakeying signal generator according to the invention, and FIG. 2 shows a second embodiment.

In FIG. 1 references 1, 2 and 3 indicate three inputs of the chroma keying signal generator according to FIG. 1 to which colour signals R (red), G (green) and B (blue) are respectively supplied. The colour signals R, G and B are derived from a video signal source, for example a colour television camera with which scene information is recorded against a substantially uniformly coloured background. When a camera embodiment is used with which only a signal encoded according to a standard television system is supplied, it is assumed that the colour signals R, G and B have been obtained by means of decoding. If the background colour occurs in the (possibly decoded) camera video signal, the generator of FIG. 1 produces a chroma keying signal CK which becomes available at a generator output 4. By means of the chroma keying signal CK, a video signal of a synchronized second can be combined with that of the first-mentioned source and be displayed there where the background occurred.

The inputs 1, 2 and 3 are connected to a matrix circuit 5. In the matrix circuit 5 a colour signal combination, indicated by Y is formed from the colour signals R, G and B supplied thereto. It holds for $Y = 0.30 R = 0.59 G = 0.11 B$ that the colour signal combination is a so-called luminance signal Y. It follows for colour signals having equal values ($R = G = B$) that the same value occurs at the luminance signal Y. When the signals are displayed with $R = G = B = Y$ a black-white coloured picture is produced.

The output of the matrix circuit 5 with the luminance signal Y is connected to an inverting (−) input of a signal combination and multiplication circuit 6, another non-inverting (+) input of which is connected to the input 1. Furthermore the circuit 6 has a setting input 7 to which an adjustable voltage ($a$) is supplied. In the circuit 6 the voltage ($a$) results in a multiplication by a factor sin $a$ which produces a colour difference signal (R-Y) sin $a$ at the output of the circuit 6. Also provided is a circuit 8 with a setting input 9 with the adjustable voltage ($a$) which circuit is connected to the input 3 and the output of the matrix circuit 5 which causes the circuit 8, having a multiplication factor cos $a$ to produce a colour difference signal (B-Y) cos $a$. It holds for the colour difference signals (R-Y) and (B-Y) that these signals are equal to zero at a black-white picture information with $R = G = B = Y$. Instead of a multiplication factor in the form of a sine and cosine, linear multiplication factors might be used equally well.

The outputs of the circuit 6 and 8 are connected to inputs of a signal adder circuit 10 for forming a composite colour difference signal (R-Y) sin $a$ + (B-Y) cos $a$ which becomes available at the output for supply to a threshold circuit 11. Furthermore the output carrying the signal Y of the matrix circuit 5 is connected to an input of the threshold circuit 11 through a signal multiplication circuit 12. The circuit 12 has a second input 13 for the supply of an adjustable voltage ($c$) so that the circuit 12 delivers a signal $cY$ to the threshold circuit 11.

The threshold circuit 11 is provided with two clamping circuits 14 and 15 for black level introduction in the composite colour difference signal and the signal cY respectively and under the control of a signal P supplied to an input 16. The signal P comprises clamping pulses which are produced in television line blanking times. By means of the clamping pulses the black level is fixed in the usual manner at a given, adjusted potential. The output of the clamping circuit 14 with the composite colour difference signal (R-Y) sin $\alpha$ + (B-Y) cos $\alpha$, the fixed black level included therein, is connected to a (+) input of a signal comparator 17. A (−) input of the signal comparator 17 is connected to the output of the clamping circuit 15 with the signal cY clamped on the black level. The signal comparator 17 is of a type which supplies a logic 1 when the composite colour difference signal (R-Y) sin $\alpha$ + (B-Y) cos $\alpha$ exceeds or is equal to the signal cY and which supplies a logic 0 in the case it is smaller. Furthermore, the threshold circuit 11 is provided with a second signal comparator 18, a (+) input of which is connected to the output of the clamping circuit 15 with the signal cY and a (−) input of which is connected to a tap of a potentiometer 19. The potentiometer 19 is arranged between a terminal having a constant dc voltage +U and ground, the tap carrying, for example, a threshold voltage $d$. A voltage value in the signal cY which exceeds or is equal to the threshold voltage $d$ causes the signal comparator 18 to deliver a logic 1 whilst a logic 0 is delivered at a smaller value. The output of the signal comparators 17 and 18 are connected to inputs of a coincidence gate 20 which is shown in the drawing as an AND-gate. The output of the gate 20 is connected to generator output 4.

The following applies to the operation of the generator of FIG. 1 with the threshold circuit 11 in particular. Unlike with the usual chroma keying signal generators in which the composite colour difference signal (R-Y) sin $\alpha$ + (B-Y) cos $\alpha$ is directly utilized for producing the keying signal, according to the formula $$(R-Y) \sin \alpha + (B-Y) \cos \alpha \geq c, \qquad (1)$$

where $\alpha$ can be adjusted between 0° and 360° depending on the background, colour, for example $\alpha$ = 347° for a blue background and where $c$ is equal to a threshold voltage value, with the chroma keying signal generator according to FIG. 1, the formula:

$$\frac{(R-Y) \sin \alpha + (B-Y) \cos \alpha}{Y} \geq c \qquad (2)$$

is used which written in another way gives:

$$(R-Y) \sin \alpha + (B-Y) \cos \alpha \geq cY \qquad (3)$$

This implies that not the colour difference signals (R-Y) and (B-Y), but the chromaticity signals (R-Y)/Y and (B-Y)/Y are used. In this way it is achieved that brightness variations, which do not affect signal generation, which is the case when colour difference signal (R-Y) and (B-Y) are used which are proportional to brightnesss variations.

In the threshold circuit 11 the formula (3) is used at the signal comparator 17. A signal value of the signal (R-Y) sin $\alpha$ + (B-Y) cos $\alpha$ which exceeds or is equal to the threshold value signal cY causes the signal comparator 17 to supply the logic 1 as the keying signal.

Thus the threshold circuit 11 operates with a threshold value cY, which varies proportional to a brightness variation (in $Y$). To avoid that at small values of the brightness the always present noise would cause the threshold to be exceeded, the second signal comparator 18 and the coincidence gate 20 have been provided. Consequently, the threshold circuit 11 according to FIG. 1 operates in accordance with the formula:

$$(R-Y) \sin \alpha + (B-Y) \cos \alpha \geq cY \geq d, \qquad (4)$$

in which $d$ acts as a minimum threshold voltage. The result is that at such a low luminance value it holds that $cY < d$, which causes the signal comparator 18 to supply the logic 0, whilst the signal comparator 17 can supply the logic 1, the AND-gate 20 remains non-conductive due to the logic 0, and no chroma keying signal CK is delivered. Thus with low luminance values, for example smaller than 10% of the peak white value of the luminance signal, the threshold circuit 11 is inoperative as regards the supply of the chroma keying signal CK. Instead of the supply of the signal cY to the signal comparator 18, the composite colour difference signal might be supplied as well.

Owing to the use of the varying threshold (cY), the distance from the signal level to the threshold level will on an average be greater than with a fixed threshold, so that the influence of noise on the keying signal generation will be less.

FIG. 2 shows an embodiment of a chroma keying signal generator which operates in accordance with formula (2). For the generator according to FIG. 1 the same reference numerals 1 to 10 inclusive have been used in FIG. 2 to indicate identical components. The deviating threshold circuit 11' according to FIG. 2 is provided with a signal divider stage 21, the output of the adder circuit 10 being connected to an input for supplying a signal to be devided, and the output of the matrix circuit 5 with the luminance signal Y is connected to an input for supplying the dividing signal. In the signal divider stage 21, the signal Y is confronted with a minimum threshold to prevent the output signal from becoming indeterminate at the low values thereof. The divider stage 21 supplies a chromaticity signal $$\frac{(R-Y) \sin \alpha + (B-Y) \cos \alpha}{Y}$$

through a subsequent clamping circuit 22 having an input 23 for supplying the clamping signal P for black level introduction to a (+) input of a signal comparator 24. A (-) input of the signal comparator 29 is connected to a tap of a potentiometer 25 applied between a terminal having a constant dc voltage +U and ground, at which tap, for example, a threshold voltage $c$ is found.

At the output of the signal comparator 24 connected to the generator output 4 the chroma keying signal CK is produced which in accordance with formula (2) is formed by the threshold circuit 11' by means of the specific chromaticity signal.

Instead of the single divider stage 21 two divider stages, subsequent to the circuit 6 and 8 might be used to form the signals $$\frac{(R-Y) \sin \alpha}{Y} \text{ and } \frac{(B-Y) \cos \alpha}{Y}$$

separately.

For the generators according to FIGS. 1 and 2, it has been described that the colour signal combination supplied by the matrix circuit 5 is the luminance signal Y = 0.30 R + 0.59 G + 0.11 B standardized in the television standard. In deviation herefrom also another colour signal combination might be used.

For clearness, it should be noted that the matrix circuit 5, the circuits 6 and 8 and the adder circuit 10 might be combined to form an adjustable matrix circuit (5-10) for supplying an adjustable, composite colour difference signal.

By adjusting the angle $\alpha$, the generator according to FIGS. 1 and 2 can be adpated to the given background colour of the scene. For a background with the primary colour blue, it follows from an (R-Y), (B-Y) vector diagram of the function (R-Y) sin $\alpha$ + (B-Y) cos $\alpha$, that $\alpha = 355°$. In an example given earlier in this application, in practice $\alpha = 347°$ was taken for a blue background. Normally the generator operates around the adjusted angle $\alpha$ in a range of colour shades. To diminish this range it is possible to enlarge the generator according to FIG. 1 by (not shown in the drawing) additional signal combination and multiplication circuits 6' and 8' an adder circuit 10', a clamping circuit 14', two signal comparators 17' and 18', a gate 20' and an additional coincident gate which is connected to the outputs of the gate 20 and 20'. Herewith the circuit 7' and 9' are, for example, adjusted to an angle $\beta = 332°$. The result is that the chroma keying signal generator, which is partly constructed in double, only supplies a keying signal for a coincident range of the two adjusted angles $\alpha$ and $\beta$. This enables a continuous improvement of the colour selection with a smaller (coincident) range for the hue. Thoughts might go towards a third or still furthergoing construction for further hue selection. To illustrate the possibilities formula (2) might be plotted for given angles $\alpha$ in a luminance independent chromaticity diagram such as, for example, the CIE colour triangle which has been omitted for simplicity of the description. The luminance dependent vector diagram which holds for colour difference signals (R-Y) (B-Y) could not be used for this purpose. For in the vector diagram having the angle as a measure for the hue, the amplitude of the factor is considered to be a measure for the colour saturation at a maximum occurring luminance, so that a luminance and color situation cannot be given separately.

What is claimed is:

1. A colour television chroma keying signal generator comprising a matrix circuit means for supplying to an output a colour signal combination of colour signals supplied to inputs thereof, two signal combination and multiplication circuits coupled to the matrix circuit output, each having an adjustable multiplication factor and output means for providing colour difference signals, a signal adder circuit means coupled to said output means for forming a composite colour difference signal, and a chromaticity signal operated threshold circuit means coupled to the adder circuit for supplying a chroma keying signal to an output of the generator.

2. A colour television chroma keying signal generator as claimed in claim 1, wherein the threshold circuit comprises a signal divider stage having a first input means coupled for supplying the signal to be divided to the adder circuit and a second input means coupled to the output of the matrix circuit with the colour signal combination for supplying the dividing signal, a signal comparator having a first input coupled to the divider stage output, a second input coupled to a source of adjustable dc. voltage, and output means for providing the chroma keying signal.

3. A colour television chroma keying signal generator as claimed in claim 1, wherein the threshold circuit comprises a first signal comparator having a first input coupled to the adder circuit which supplies the composite colour difference signal, a second input coupled to the output of the matrix circuit with the colour signal combination, and an output means for providing a chroma keying signal.

4. A colour television chroma keying signal generator as claimed in claim 3, wherein the threshold circuit further comprises a second signal comparator having a first input coupled to one of the two inputs of the first comparator, a second input coupled to a source of adjustable dc voltage, and an output; and a coincidence gate having a pair of inputs coupled to said comparator outputs respectively, and an output coupled to said generator output.

5. A colour television chroma keying signal generator as claimed in claim 3, further comprising an adjustable signal multiplication circuit coupled between the output of the matrix circuit with the colour signal combination and the threshold circuit.

6. Colour television studio equipment provided with a chroma keying signal generator as claimed in claim 1.

* * * * *